US008750293B2

(12) United States Patent
Holmer

(10) Patent No.: US 8,750,293 B2
(45) Date of Patent: Jun. 10, 2014

(54) APPARATUS AND METHOD FOR RENDERING VIDEO WITH RETRANSMISSION DELAY

(75) Inventor: Stefan Holmer, Stockholm (SE)

(73) Assignee: Google Inc., Mountain View, CA (US)

( * ) Notice: Subject to any disclaimer, the term of this patent is extended or adjusted under 35 U.S.C. 154(b) by 423 days.

(21) Appl. No.: 13/144,586

(22) PCT Filed: May 6, 2011

(86) PCT No.: PCT/US2011/035470
§ 371 (c)(1),
(2), (4) Date: Sep. 20, 2011

(87) PCT Pub. No.: WO2012/154152
PCT Pub. Date: Nov. 15, 2012

(65) Prior Publication Data
US 2012/0281562 A1 Nov. 8, 2012

(51) Int. Cl.
| H04L 12/66 | (2006.01) |
| H04L 29/06 | (2006.01) |
| H04L 1/16 | (2006.01) |
| H04N 21/6375 | (2011.01) |
| H04N 21/647 | (2011.01) |
| H04N 21/44 | (2011.01) |

(52) U.S. Cl.
CPC ............ *H04L 29/06448* (2013.01); *H04L 1/16* (2013.01); *H04L 29/06462* (2013.01); *H04L 29/06455* (2013.01); *H04N 21/6375* (2013.01); *H04N 21/64776* (2013.01); *H04N 21/44004* (2013.01)
USPC ......................................... 370/353

(58) Field of Classification Search
None
See application file for complete search history.

(56) References Cited

U.S. PATENT DOCUMENTS 6,700,893 B1  3/2004  Radha et al.

OTHER PUBLICATIONS

Declaration of Stefan Holmer, executed on May 30, 2011.
International Search Report and Written Opinion dated Aug. 31, 2011, for International Application No. PCT/US2011/035470 (13 pp).
Begen, Ali C., et al; "An Adaptive Media-Aware Retransmission Timeout Estimation Method for Low-Delay Packet Video", IEEE Transactions on Multimedia, vol. 9, No. 2 (Feb. 1, 2007) pp. 332-347.
Begen, Ali C., et al; "Proxy-assisted interactive-video services over networks wit large delays", Signal Processing: Image Communication, vol. 20, No. 8 (Sep. 1, 2005) pp. 755-772.
Liu, Haining, et al; "On the Adaptive Delay and Synchronization Control of Video Conferencing over the Internet", International Conference on Networking (ICN) (2004) 8 pp.

(Continued)

*Primary Examiner* — John Blanton
*Assistant Examiner* — Christopher Crutchfield
(74) *Attorney, Agent, or Firm* — Young Basile Hanlon & MacFarlane P.C.

(57) ABSTRACT

A system, apparatus, and method for rendering a video stream, the video stream having a plurality of frames. One method includes receiving the plurality of frames via a network, each frame having an estimated arrival time, determining a retransmission rendering delay, based on a round-trip delay and a round-trip delay constant, for a current frame of the plurality of frames using a processor, determining a render time for the current frame using a sum of the current frame's estimated arrival time and the retransmission rendering delay, and rendering the current frame at the render time.

18 Claims, 5 Drawing Sheets

(56) References Cited

OTHER PUBLICATIONS

Liu, Hang, et al; "Delay and Synchronization Control Middleware to Support Real-Time Multimedia Services over Wireless PCS Networks", IEEE Journal on Selected Areas in Communications, IEEE Service Center, vol. 17, No. 9 (Sep. 1, 1999) pp. 1660-1672.

Laoutaris, Nikolaos, et al; "Intrastream Synchronization for Continuous Media Streams: A Survey of Playout Schedulers", IEEE Network, IEEE Service Center, vol. 16, No. 3 (May 1, 2002) pp. 30-40.

Al-Omari, Huthaifa, et al; "Avoiding Delay Jitter in Cyber-Physical Systems Using One Way Delay Variations Model", Computational Science and Engineering, 2009 International Conference, IEEE (Aug. 29, 2009) pp. 295-302.

Liang, Yi J., et al; "Adaptive Playout Scheduling Using Time-Scale Modification in Packet Voice Communications", 2001 IEEE International Conference on Acoustics, Speech, and Signal Processing, vol. 3 (May 7, 2001), pp. 1445-1448.

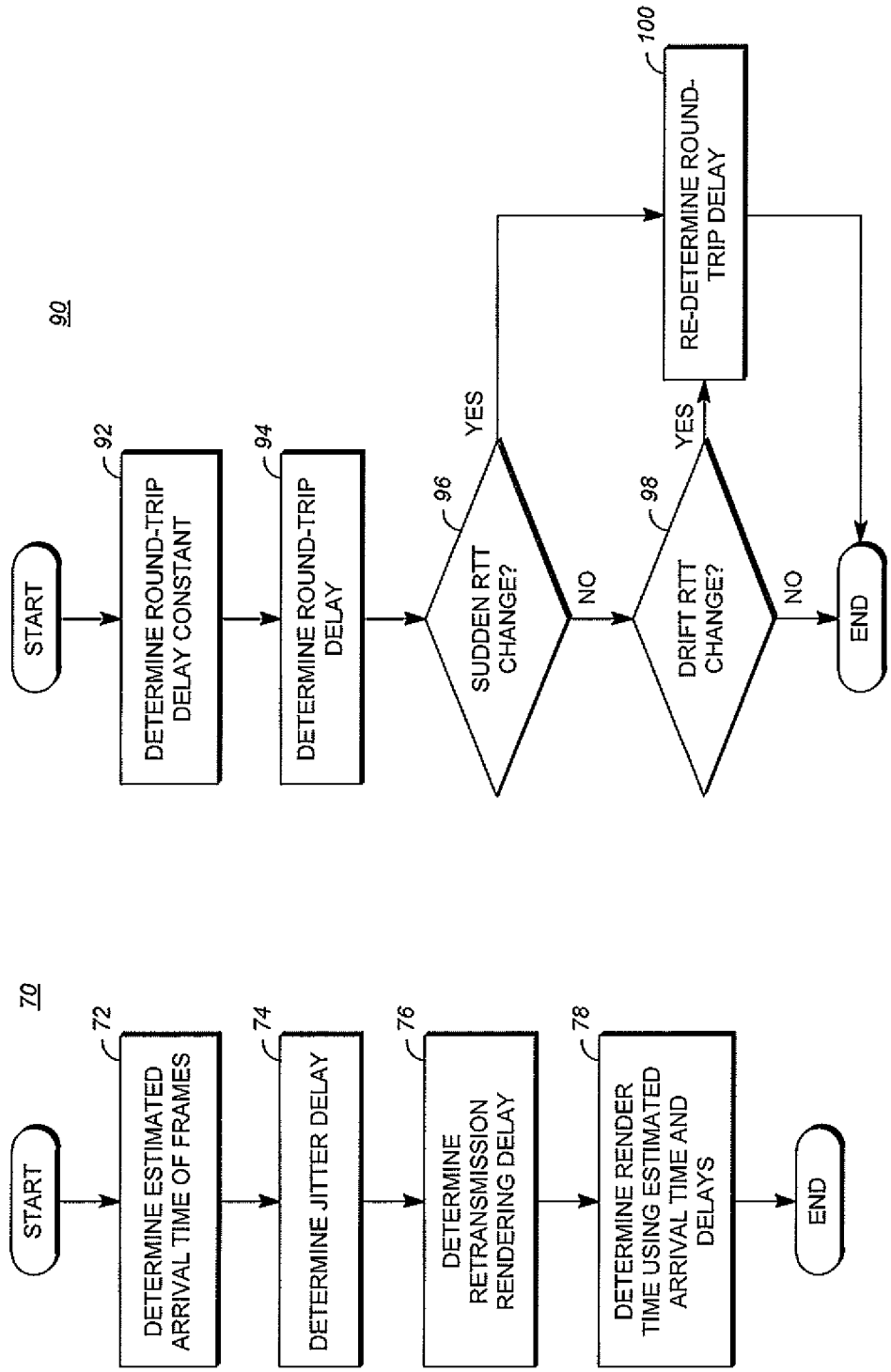

APPARATUS AND METHOD FOR RENDERING VIDEO WITH RETRANSMISSION DELAY

CROSS REFERENCE TO RELATED APPLICATIONS

This application claims priority from International Patent Application Serial No. PCT/US11/35470, filed May 6, 2011, which is incorporated herein in its entirety.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth. One type of video transmission includes real-time encoding and transmission, in which the receiver of a video stream decodes and renders frames as they are received.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

SUMMARY

Disclosed herein are embodiments of methods and apparatuses for rendering a video signal.

Included in the disclosed embodiments is a method for rendering a video stream, the video stream having a plurality of frames. The method includes receiving the plurality of frames via a network, each frame having an estimated arrival time, determining a retransmission rendering delay, based on a round-trip delay and a round-trip delay constant, for a current frame of the plurality of frames using a processor, determining a render time for the current frame using a sum of the current frame's estimated arrival time and the retransmission rendering delay, and rendering the current frame at the render time.

Also included in the disclosed embodiments is a method for rendering a current frame from a video stream's plurality of frames. The method includes receiving the current frame, determining an estimated arrival time for the current frame, determining a jitter rendering delay, determining a packet loss probability for the current frame, determining a retransmission rendering delay based on the packet loss probability and the larger of a previous frame's retransmission rendering delay and the current frame's round-trip time using a processor, determining a render time for the current frame by adding the estimated arrival time, the jitter rendering delay and the retransmission rendering delay, and rendering the current frame at the render time.

Also included in the disclosed embodiments is an apparatus for rendering a video stream, the video stream having a plurality of frames. The apparatus comprises a memory and at least one processor configured to execute instructions stored in the memory to receive the plurality of frames via a network, each frame having an estimated arrival time, determine a retransmission rendering delay for a current frame of the plurality of frames, determine a render time for the current frame using the estimated arrival time and the retransmission rendering delay of the current frame, and render the current frame at the render time.

These and other embodiments, including combinations and variations of these embodiments, will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4 is a flow chart of a method of determining a render time for a frame;

FIG. 5 is a flow chart of a method of determining a retransmission rendering delay;

DETAILED DESCRIPTION

Figure 1:
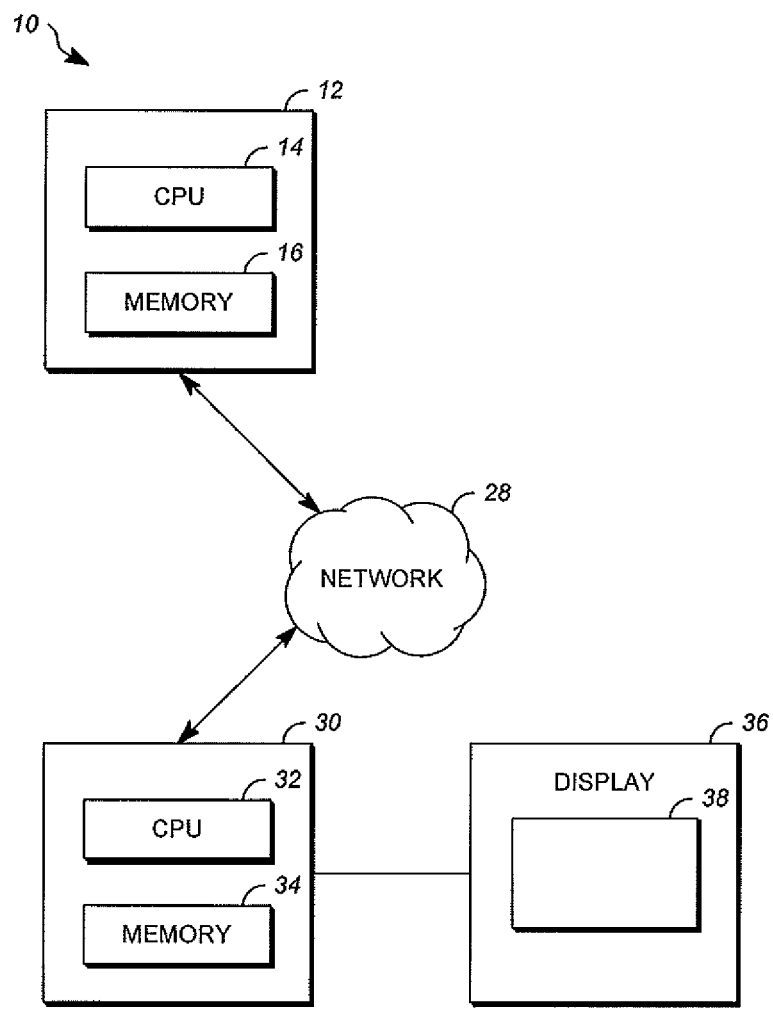
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 is a controller for controlling the operations of transmitting station 12. CPU 14 is connected to memory 16 by, for example, a memory bus. Memory 16 may be random access memory (RAM) or any other suitable memory device. Memory 16 stores data and program instructions that are used by CPU 14. Other suitable implementations of transmitting station 12 are possible.

A network 28 connects transmitting station 12 and a receiving station 30 for transmission of an encoded video stream. Specifically, the video stream can be encoded by an encoder in transmitting station 12 and the encoded video stream can be decoded by a decoder in receiving station 30. Network 28 may, for example, be the Internet, which is a packet-switched network. Network 28 may also be a local area network (LAN), wide area network (WAN), virtual private network (VPN), or any other means of transferring the video stream from transmitting station 12.

The transmission of the encoded video stream can be accomplished using a real-time protocol, such as the real-time transport protocol (RTP) standard as promulgated by the Internet Engineering Task Force (IETF). Control of the transmission can be accomplished using the real-time transport control protocol (RTCP) defined in the RTP standard. For example, RTCP can allow a receiving station to determine information about the round-trip time $T_{RTT}(n)$ of transmission. The round-trip time $T_{RTT}(n)$ is an estimate by the transmission protocol of the amount of time that would be required for a transmitting station to transmit a frame of video to a receiving station and receive back an acknowledgement of receipt from the receiving station.

However, the round-trip time $T_{RTT}(n)$ can alternatively be determined differently if a protocol other than RTCP is used. The round-trip time $T_{RTT}(n)$ includes only network transmission time and excludes any processing time at the receiving station to send the acknowledgement after receipt of the frame. The round-trip time $T_{RTT}(n)$ is the round-trip time as of frame n. However, the round-trip time may be determined or received via RTCP at a frequency less than the frame rate. For example, the receiving station may receive thirty frames in one second while only receiving a new round-trip time $T_{RTT}(n)$ five times per second.

Receiving station 30, in one example, may be a computer having an internal configuration of hardware including a processor such as a central processing unit (CPU) 32 and a memory 34. CPU 32 is a controller for controlling the operations of receiving station 30. CPU 32 can be connected to memory 34 by, for example, a memory bus. Memory 34 may be RAM or any other suitable memory device. Memory 34 stores data and program instructions that are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a rendering of the video stream decoded by the decoder in receiving station 30.

Other implementations of the encoder and decoder system 10 are possible. In one implementation, additional components may be added to the encoder and decoder system 10. For example, a display or a video camera may be attached to transmitting station 12 to capture the video stream to be encoded. In another implementation, a transport protocol other than RTP may be used.

Real-time encoding, transmission, decoding and rendering can result in a rendered video stream (i.e. on display 36) that includes gaps in the video stream if there are portions of the original video stream that are lost or delayed in transmission. One way to recover lost packets is for the transmitting station to re-transmit the missing portion of the video stream. In a packet-switched network, the lost portion would include one or more lost packets, and the retransmission would include those one or more lost packets. However, the retransmission of packets results in a delay in the receipt of frames by the receiving station. This delay can cause a video freeze or an error that can be displayed on the receiving station.

At least some gaps can be avoided by rendering at a render time calculated by adding a delay to the actual receive time of video stream frames. However, variations in the arrival time of frames can be caused by, for example, changes in network transmission time (network jitter), changes in the amount of time to encode the frames, and clock drift between the transmitting station and the receiving station. These variations can cause a video stream to be rendered at frame rates different than at which the video stream was encoded or captured.

To render the video stream while minimizing such variations, the render time can be based on an estimated arrival time instead of the actual arrival time. The estimated arrival time is determined using a filter designed to filter out the variations. The estimated arrival time can determine an actual render time at which frames are rendered, instead of rendering frames out of a buffer at a constant frame rate and adjusting for variations such as clock drift by manipulating the buffer (i.e. by dropping frames).

Figure 2:
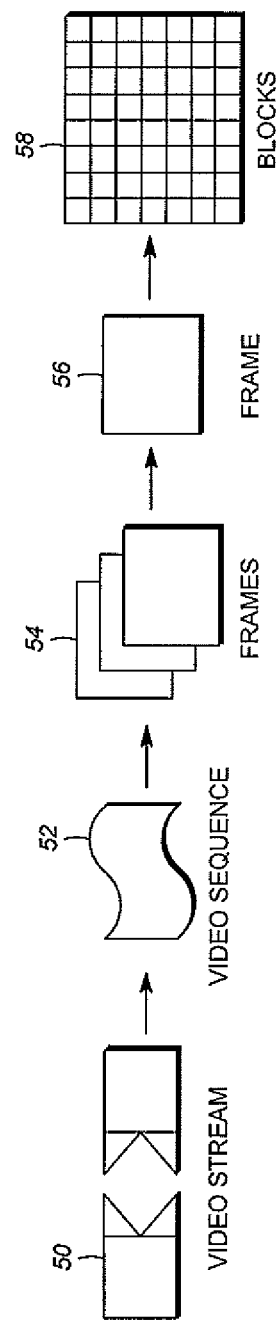
FIG. 2 is a diagram of a video stream.

FIG. 2 is a diagram of a typical video stream 50 to be encoded and decoded. Video coding formats, for example, VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks 58, which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups. Other encoding/decoding formats for frames 54, including those that are not block-based, can be used.

Figure 3:
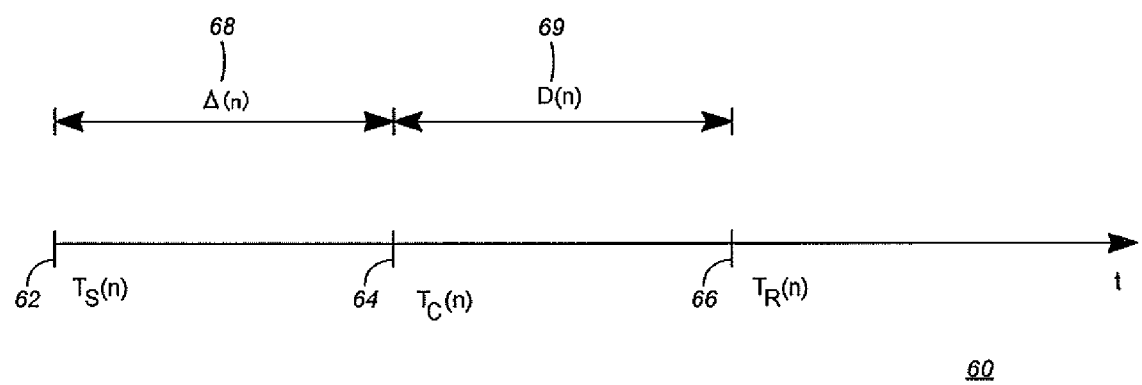
FIG. 3 is a timeline of transmitting and rendering a frame of a video stream.

FIG. 3 is a timeline 60 of transmitting and rendering a frame n (current frame) of a video stream in the video encoding and decoding system of FIG. 1. The frame has a timestamp $T_S(n)$ 62 assigned by a transmitting station. $T_S(n)$ 62 is generated using the transmitting station's clock. The timestamp can be a send time of when the frame is sent to the receiving station by the transmitting station or a capture time of when the frame is captured by a capture device, such as a video camera. The frame can be transmitted with the timestamp. The frame has an estimated arrival time $T_c(n)$ 64 of when the frame is expected to arrive at the receiving station. The estimated arrival time $T_c(n)$ 64 is determined using the receiving station's clock and is described further later.

The frame will be rendered at the render time $T_R(n)$ 66 on the receiving station. The frame may be rendered at the render time $T_R(n)$ 66 even if the frame is not actually rendered at that time. The render time $T_R(n)$ 66 is a target time for rendering and the time that the rendering actually occurs at may vary from the render time. The difference between these values can be, for example, due to high resource utilization of the receiving station's resources. Other factors may also contribute to the difference.

The time interval between the timestamp $T_S(n)$ 62 and the estimated arrival time $T_c(n)$ 64 is the estimated one-way time offset $\Delta(n)$ 68. The estimated one-way time offset $\Delta(n)$ 68 includes a one-way transmission time for the frame to transit the network 28 and a clock offset, which is the difference between the transmitting station and receiving station clocks. The time interval between the estimated arrival time 64 and the render time $T_R(n)$ 66 is the delay D(n) 69. The delay D(n) 69 is determined and used by the decoder to account for at least some expected variations in the actual arrival time of the frame. Delay D(n) 69 can include, for example, a jitter delay $D_J(n)$ and a retransmission rendering delay $D_{RTT}(n)$. Delay D(n) 69 may alternatively include other delays in other implementations.

The actual arrival time of the frame can be any time after timestamp $T_S(n)$ 62. Generally, the delay 69 will be of a time interval where the actual arrival time of frames will be earlier than the render time $T_R(n)$ 66. In this case, the frame will be rendered at its render time, and gaps in the rendered video stream will be avoided. However, in certain circumstances, it may be advantageous for the actual arrival time to be after the render time. For example, in the case of severe network congestion where frames are delayed for a significant period of time, allowing video jitter or gaps may be advantageous as compared to introducing a significant delay resulting in a significantly later render time.

FIG. 4 is a flow chart of a method 70 of determining a render time $T_R(n)$ for a frame n. The method 70 can be performed by a decoder on a receiving station, such as receiving station 30, upon receipt of one or more frames of a video stream. At stage 72, estimated arrival time $T_C(n)$ of the frame n is determined using various techniques. One technique includes estimating arrival time 64 of the frame based on the actual arrival times of previously received frames. For example, an average time interval between actual arrival times of previously received frames could be used to estimate when the frame will arrive. In alternative examples, histograms, curve fitting techniques and statistical analysis could be utilized to determine estimated arrival time 64. The time intervals between estimated arrival times 64 of successive frames may be constant. Alternatively, the time intervals between estimated arrival times 64 may change over time to, for example, account for changing network conditions.

At stage 74, a jitter delay $D_J(n)$ for frame n is determined. The purpose of jitter delay $D_J(n)$ is to account for variations in the one-way time offset of the transmission of frames from transmitting station 12 to receiving station 30 caused by jitter. The jitter delay can be determined based on the actual arrival times of previously received frames and the timestamps of previously received frames. The jitter delay can alternatively be determined using other techniques.

At stage 76, a retransmission rendering delay is determined. The retransmission rendering delay accounts for the time needed to re-transmit a frame in the event that it is lost during transmission. The retransmission rendering delay can include a round-trip delay $D_{RTT}(n)$ and a round-trip delay constant $\eta$. The determination of these values is described later.

At stage 78, render time $T_R(n)$ is determined using the values determined above. One method of determining the render time is shown below:

$$T_R(n) = T_C(n) + D_J(n) + \eta D_{RTT}(n) \qquad (1)$$

Variations of the method 70 for determining render time $T_R(n)$ are possible. For example, jitter delay $D_J(n)$ may be omitted and/or other delays added. Or in another example, timestamp 62 may be used with one-way time offset 68 instead of estimated arrival time 64 to determine render time $T_R(n)$. Other variations are also possible.

FIG. 5 is a flow chart of a method 90 of determining the retransmission rendering delay of stage 76. The method 90 is performed when a new round-trip time is received or determined by the receiving station 30. A new round-trip time can be received less often than frames. For example, one updated round-trip time may be received for every five frames. If a new round-trip time has not been received since the previous frame, then that frame's round-trip time is the round-trip time of the previous frame.

In one implementation, and as shown by example in formula (1) above, the retransmission rendering delay is the product of round-trip delay $D_{RTT}(n)$ and round-trip delay constant $\eta$. At stage 92, round-trip delay constant $\eta$ is determined. Round-trip delay constant $\eta$ modifies round-trip delay $D_{RTT}(n)$. In some implementations, round-trip delay constant $\eta$ may always be one—in other words, the retransmission rendering delay is round-trip delay $D_{RTT}(n)$.

In other implementations, round-trip delay constant $\eta$ is used to modify round-trip delay $D_{RTT}(n)$ based on the probability of packet loss p(loss). In the examples herein, p(loss) is a value between 0 and 1, wherein 0 indicates no probability of packet loss and 1 indicates that there will always be packet loss. The packet loss probability can be determined by, for example, dividing the total number of packets lost by the total number of packets received over a time period. Other methods of determining packet loss probability are also available. For example, a weighted average technique may be used, wherein recent packet losses are more heavily weighted in the probability determination than more remote packet losses.

One formula for determining the round-trip delay constant $\eta$ using p(loss) is as follows:

$$\eta = \sum_{i=1}^{X} u(p(\text{loss})^i P); \text{ wherein} \qquad (2)$$

P is a probability threshold; and
u( ) is the unit-step function, defined as:

$$u(x-P) = 1, \text{ if } x \geq P \qquad (3)$$

$$u(x-P) = 0, \text{ if } x < P \qquad (4)$$

In formula (2), the probabilities of one and more successive packet losses are evaluated. For each packet loss that exceeds the probability threshold P, the value of round-trip delay constant $\eta$ is increased by one. For example, if the packet loss probability indicates that the probability of losing two packets (for the same frame) exceeds P, then the round-trip delay constant $\eta$ would be two.

In another implementation, any pre-determined function f( ) can instead be used for determining the round-trip delay constant $\eta$ as follows:

$$\eta = \sum_{i=1}^{X} f(p(\text{loss})^i); \text{ wherein} \qquad (5)$$

f( ) is a function defined as:

$$f(x) = 0, \text{ if } x < a; \qquad (6)$$

$$f(x) = \frac{x-a}{b-a}, \text{ if } a \leq x \leq b; \text{ and} \qquad (7)$$

$$f(x) = 1, \text{ if } x > b; \text{ wherein} \qquad (8)$$

a and b are pre-determined constants.

In formula (5), a piecewise function f( ) is used to "soften" the transition between zero and one. In this formula, the transition slope is controlled by the parameters a and b. These parameters may be pre-determined before decoding, or may be determined by the decoder during decoding. However, this function is only one variation of functions that may be used. Others include a unit-step function as described previously (i.e., f(x)=u(x−P)) and other functions.

Variations of formulas (2) or (5) may be used for various implementations. For example, the summation may not use infinity as an upper bound. Instead, the summation's upper bound may be lower based on implementation constraints or based on the level of precision required. For example, a pre-determined upper bound "N" may be used to limit the amount of computation required in an implementation. In another example, the summation may be stopped at a given value of i when the result of the function for that value of i is zero. In other words, the summation may be stopped when it is known that the probability of additional packet losses will be less than the threshold P.

In stage 94, round-trip delay $D_{RTT}(n)$ is determined. Round-trip delay $D_{RTT}(n)$ for a frame n can be determined using the following formula:

$$D_{RTT}(n) = \max\{D_{RTT}(n-1), T_{RTT}(n)\}; \text{ wherein} \qquad (9)$$

$D_{RTT}(n-1)$ is the round-trip delay for the previous frame n−1;
$T_{RTT}(n)$ is a round-trip time for frame n.

With respect to formula (9), the round-trip delay $D_{RTT}$ for the first frame in a video stream can be determined using the round-trip time $T_{RTT}$ for that first frame. In a similar implementation, the round trip delay for the frame before the first frame $D_{RTT}(0)$ can be initialized to a small value, such as zero, so that the first frame's round-trip delay $D_{RTT}$ is its round-trip time $T_{RTT}$. Other formulas or methods may be used to determine round-trip delay $D_{RTT}(n)$. In other implementations, a measure other than round-trip time $T_{RTT}(n)$ may be used. For example, an experiential model may be used wherein the actual transmission time of previous retransmissions are measured and used to determine round-trip delay $D_{RTT}(n)$.

Figure 6:
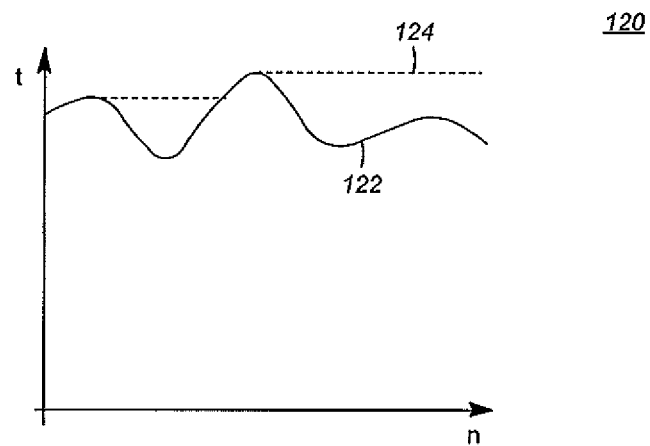
FIG. 6 is a graph illustrating the determination of a round-trip delay.

FIG. 6 is a graph 120 illustrating the determination of round-trip delay $D_{RTT}(n)$ according to formula (9). Round-trip time $T_{RTT}(n)$ (solid line 122) is shown over time. Round-trip delay $D_{RTT}(n)$ (dashed line 124) shows the round-trip delay that determined using formula (9). As graph 120 shows, round-trip delay $D_{RTT}(n)$ identifies the maximum round-trip time of previously received frames to find the round-trip delay for a current frame.

Referring back to FIG. 5, in stage 96, the decoder checks for a sudden round-trip time change ("sudden change"). The decoder uses statistics of previous round-trip times to detect the sudden change. A sudden change can be detected using this formula:

$$\sum_{i=0}^{N_1-1} u(\tilde{T}_1(n-i) - \gamma_1) > \gamma_2; \text{ wherein} \quad (10)$$

$N_1$ is a pre-determined number of recent frames to test;
$\tilde{T}_1(n)$ is defined as:

$$\tilde{T}_1(n) = \overline{T_{\text{RTT}}}(n) - T_{RTT}(n); \quad (11)$$

$\overline{T_{\text{RTT}}}(n)$ is an average round trip time and is defined as:

$$\overline{T_{\text{RTT}}}(n) = \alpha \overline{T_{\text{RTT}}}(n-1) + (1-\alpha) T_{RTT}(n); \quad (12)$$

$\alpha$ is a weighting constant that can be selected from the interval [0.9, 0.999];
$\gamma_1$ is a confidence threshold defined as:

$$\gamma_1 = \zeta_1 \sigma_{RTT}(n) \quad (13)$$

$\zeta_1$ is a confidence-interval factor;
$\sigma_{RTT}(n)$ is the standard deviation of round-trip times and can be calculated as the square root of the estimated variance of round-trip times $\sigma^2_{RTT}(n)$, which is defined as:

$$\sigma_{RTT}^2(n) = \alpha \sigma_{RTT}^2(n-1) + (1-\alpha) \tilde{T}_1(n)^2; \text{ and} \quad (14)$$

$\gamma_2$ is a sudden-change threshold that is a positive integer.

If the result of formula (10) is true (i.e., the result of the summation is greater than $\gamma_2$), then a sudden round-trip time change exists. In alternative implementations, variables in the above formula may be eliminated, added, or calculated differently. For example, the standard deviation may be calculated directly instead of by the square root of a variance. In another example, the actual average round-trip time may be estimated using an arithmetic mean.

If a sudden round-trip time change is not found in stage 96, the decoder determines whether there has been a drift round-trip time change ("drift change") in stage 98. A drift change can be detected using this formula:

$$\sum_{i=0}^{N_1-1} u(\tilde{T}_2(n-i) - \gamma_3) > \gamma_4; \text{ wherein} \quad (15)$$

$\tilde{T}_2(n)$ is defined as:

$$\tilde{T}_2(n) = D_{RTT}(n) - \overline{T_{\text{RTT}}}(n); \quad (16)$$

$\gamma_3$ is a confidence threshold defined as:

$$\gamma_3 = \zeta_2 \sigma_{RTT}(n) \quad (17)$$

$\zeta_2$ is a confidence-interval factor; and
$\gamma_4$ is a drift-change threshold that is a positive integer.

If the result of formula (15) is true (i.e., the result of the summation is greater than $\gamma_4$), then a drift round-trip time change exists. In alternative implementations, variables in the above formula may be eliminated, added or calculated differently. For example, the standard deviation may be calculated directly instead of by the square root of a variance. In another example, the actual average round-trip time may be calculated instead of being estimated.

If a drift change is not found in stage 98, the method ends. Round-trip delay constant η determined in stage 92 and round-trip delay $D_{RTT}(n)$ determined in stage 94 will be used to determine the retransmission rendering delay of the frame. However, if either a sudden or drift change was detected in stage 96 or stage 98 respectively, control will pass to stage 100, where round-trip delay $D_{RTT}(n)$ is re-determined. The re-determination of round-trip delay $D_{RTT}(n)$ uses a pre-defined number of round-trip times for recent frames as shown below:

$$D_{RTT} = \max\{T_{RTT}(n), T_{RTT}(n-1), \ldots, T_{RTT}(n-N_1+1)\} \quad (18)$$

In addition, average round-trip time $\overline{T_{RTT}}$ is re-determined as follows:

$$\overline{T_{RTT}} = \frac{1}{N_1 - 1} \sum_{i=0}^{N_1-1} T_{RTT}(n-i) \quad (19)$$

These re-determinations replace round-trip delay $D_{RTT}(n)$ with the largest round-trip time $T_{RTT}$ of the recent past and replaces average round-trip time $\overline{T_{RTT}}$ with the average of round-trip time values from the recent past. The round-trip time values from the recent past are defined by $N_1$, which is a number of recent frames including the current frame. These new values replace the previous values based on values from the start of the video stream or the last re-determination. Once the values are re-determined in step 100, the new round-trip delay is used along with round-trip delay constant η to determine the retransmission rendering delay of the current frame.

The purpose of formulas (10) and (15) is to detect changes in network delay for retransmissions that are not caused by mere network congestion. These formulas for detecting sudden change and drift change are only two ways of detecting a change in network delay for retransmissions and other detectors are possible in other implementations.

Figure 7:
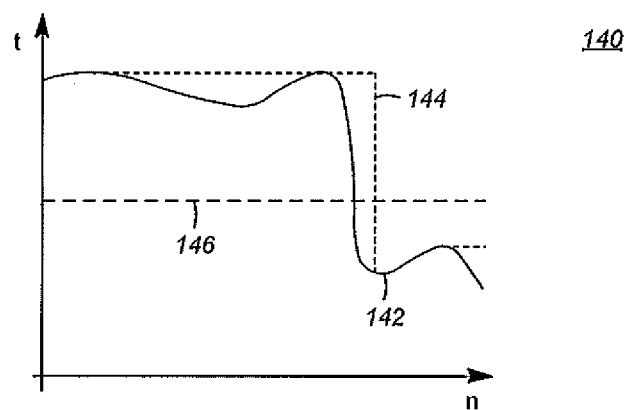
FIG. 7 is a graph illustrating a sudden round-trip time change.

FIG. 7 is a graph 140 illustrating a sudden round-trip time change. Round-trip time $T_{RTT}$ (solid line 142) is shown over time. Round-trip delay $D_{RTT}$ (dashed line 144) is shown both before and after the detection of the sudden round-trip change. Confidence factor $\gamma_1$ (dotted line 146) used for detecting the sudden round-trip change is also shown.

Figure 8:
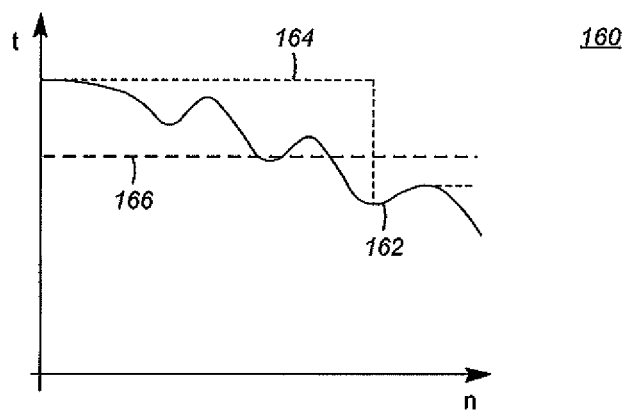
FIG. 8 is a graph illustrating a drift round-trip time change.

FIG. 8 is a graph 160 illustrating a drift round-trip time change. Round-trip time $T_{RTT}$ (solid line 162) is shown over time. Round-trip delay $D_{RTT}$ (dashed line 164) is shown both before and after the detection of the drift round-trip change.

Confidence factor $\gamma_3$ (dotted line 166) used for detecting the drift round-trip change is also shown.

The above-described embodiments of encoding or decoding may illustrate some exemplary encoding techniques. However, in general, encoding and decoding as those terms are used in the claims are understood to mean compression, decompression, transformation or any other change to data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in certain embodiments, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized that contains specialized hardware for carrying out any of the methods, algorithms, or instructions described herein.

Transmitting station 12 and receiving station 30 can, for example, be implemented on computers in a screencasting or a videoconferencing system. Alternatively, transmitting station 12 can be implemented on a server and receiving station 30 can be implemented on a device separate from the server, such as a hand-held communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for rendering a video stream, the video stream having a plurality of frames, the method comprising:
  receiving the plurality of frames via a network, each frame having an estimated arrival time;
  determining a retransmission rendering delay, based on a round-trip delay and a round-trip delay constant, for a current frame of the plurality of frames using a processor, wherein the round-trip delay for the current frame is determined based on a round-trip time of the current frame and a round trip time of one or more previously received frames, the previously received frames received before the current frame;
  determining a render time for the current frame using a sum of the estimated arrival time and the retransmission rendering delay of the current frame; and
  rendering the current frame at the render time.

2. The method of claim 1, wherein determining the round-trip delay constant for the current frame includes at least one of determining the round-trip delay constant using the formula $$\sum_{i=1}^{N} f(p(\text{loss})^i),$$

wherein f is a pre-determined function, p(loss) is a packet loss probability for the current frame, and N is an upper limit of the summation, or determining the round-trip delay constant as a pre-determined integer.

3. A method for rendering a video stream, the video stream having a plurality of frames, the method comprising:
  receiving the plurality of frames via a network, each frame having an estimated arrival time;
  determining a retransmission rendering delay, based on a round-trip delay and a round-trip delay constant, for a current frame of the plurality of frames using a processor;
  determining the round-trip delay constant using the formula $$\sum_{i=1}^{N} f(p(loss)^i),$$

wherein f is a pre-determined function, p(loss) is a packet loss probability for the current frame, and N is an upper limit of the summation;
  determining a number of packets received and a number of packets lost over a time period;
  determining the packet loss probability for the current frame by dividing the number of packets received by the number of packets lost;
  determining a render time for the current frame using a sum of the estimated arrival time and the retransmission rendering delay of the current frame; and
  rendering the current frame at the render time.

4. The method of claim 2, wherein the pre-determined function f is a unit-step function.

5. The method of claim 2, wherein determining the retransmission rendering delay comprises:
  determining the retransmission rendering delay based on a product of the round-trip delay and the round-trip delay constant.

6. A method for rendering a video stream, the video stream having a plurality of frames, the method comprising:
    receiving the plurality of frames via a network, each frame having an estimated arrival time;
    determining a retransmission rendering delay, based on a round-trip delay and a round-trip delay constant, for a current frame of the plurality of frames using a processor;
    determining at least one statistic of round-trip times of at least some of the plurality of frames; and
    determining the round-trip delay as a maximum of the round-trip times of a pre-determined number of previously received frames if a sudden round-trip time change or a drift round-trip time change is detected using the at least one statistic;
    determining a render time for the current frame using a sum of the estimated arrival time and the retransmission rendering delay of the current frame; and
    rendering the current frame at the render time.

7. The method of claim 6, wherein determining the at least one statistic comprises:
    (a) calculating an average round-trip time of at least some of the plurality of frames; and
    (b) calculating a standard deviation of the round-trip times of at least some of the plurality of frames; and wherein determining the round-trip delay includes:
        detecting the sudden round-trip time change when $$\sum_{i=0}^{N_1 1} u(\tilde{T}_1(n-i) - \gamma_1) > \gamma_2;$$

wherein
$N_1$ is the pre-determined number of previously received frames;
u( ) is a unit step function;
$\tilde{T}_1(n-i)$ is the difference between the average round-trip time and the round-trip time of frame n–i;
n is the index of the current frame in the video stream;
$\gamma_1$ is the standard deviation multiplied by a pre-determined constant; and
$\gamma_2$ is a sudden-change threshold.

8. The method of claim 6, wherein determining the at least one statistic comprises:
    (a) a difference between the round-trip delay and the round-trip times of at least some of the plurality of frames; and
    (b) a variance of the round-trip times of at least some of the plurality of frames; and wherein determining the round-trip delay includes:
        detecting a drift round-trip time change using the formula $$\sum_{i=0}^{N_1 1} u(\tilde{T}_2(n-i) - \gamma_3) > \gamma_4,$$

wherein
$N_1$ is the pre-determined number of previously received frames;
u( ) is the unit step function;
$\tilde{T}_2(n-i)$ is the difference between the average round-trip time and the round-trip delay of frame n–i;
n is the index of the current frame in the video stream;
$\gamma_3$ is the variance multiplied by a pre-determined constant; and
$\gamma_4$ is a drift-change threshold.

9. A method for rendering a video stream, the video stream having a plurality of frames, the method comprising:
    receiving the plurality of frames via a network, each frame having an estimated arrival time;
    determining the estimated arrival time based on actual arrival times of previously received frames, the previously received frames received before the current frame;
    determining a retransmission rendering delay, based on a round-trip delay and a round-trip delay constant, for a current frame of the plurality of frames using a processor;
    determining a render time for the current frame using a sum of the estimated arrival time and the retransmission rendering delay of the current frame; and
    rendering the current frame at the render time.

10. An apparatus for rendering a video stream, the video stream having a plurality of frames, the apparatus comprising:
    a memory; and
    a processor configured to execute instructions stored in the memory to:
        receive the plurality of frames via a network, each frame having an estimated arrival time;
        determine a retransmission rendering delay, based on a round-trip delay and a round-trip delay constant, for a current frame of the plurality of frames;
        determine the round-trip delay for the current frame based on a round-trip time of the current frame and a round-trip time of one or more previously received frames, the previously received frames received before the current frame;
        determine the round-trip delay constant using the formula $$\sum_{i=1}^{N} f(p(\text{loss})^i),$$

wherein f is a pre-determined function, p(loss) is a packet loss probability of the current frame, and N is an upper limit of the summation;
        determine a render time for the current frame using the estimated arrival time and the retransmission rendering delay of the current frame; and
        render the current frame at the render time.

11. The apparatus of claim 10, wherein the instructions to determine the round-trip delay include instructions to:
    determine at least one statistic of the round-trip times of at least some of the plurality of frames; and
    determine the round-trip delay as a maximum of the round-trip times of a pre-determined number of previously received frames if a sudden round-trip time change or a drift round-trip time change is detected using the at least one statistic.

12. The apparatus of claim 11, wherein instructions to determine the at least one statistic include instructions to:
    (a) calculate an average round-trip time of at least some of the plurality of frames; and
    (b) calculate a standard deviation of the round-trip times of at least some of the plurality of frames; and wherein instructions to determine the round-trip delay includes instructions to:

detect the sudden round-trip time change when $$\sum_{i=0}^{N_1-1} u(\tilde{T}_1(n-i) - \gamma_1) > \gamma_2;$$

wherein
$N_1$ is the pre-determined number of previously received frames;
u( ) is a unit step function;
$\tilde{T}_1(n-i)$ is the difference between the average round-trip time and the round-trip time of frame n−i;
n is the index of the current frame in the video stream;
$\gamma_1$ is the standard deviation multiplied by a pre-determined constant; and
$\gamma_2$ is a sudden-change threshold.

13. A method for rendering a current frame from a video stream's plurality of frames, the method comprising:
   receiving the current frame;
   determining an estimated arrival time for the current frame;
   determining a jitter rendering delay;
   determining a packet loss probability for the current frame;
   determining a retransmission rendering delay based on the packet loss probability and the larger of a previous frame's retransmission rendering delay and the current frame's round-trip time using a processor;
   determining a render time for the current frame by adding the estimated arrival time, the jitter rendering delay and the retransmission rendering delay; and
   rendering the current frame at the render time.

14. The method of claim 13, wherein determining the retransmission rendering delay comprises:
   determining a round-trip delay for the current frame;
   determining a round-trip delay constant for the current frame; and
   determining the retransmission rendering delay using the round-trip delay and the round-trip delay constant.

15. The method of claim 14, wherein determining the round-trip delay constant for the current frame includes at least one of determining the round-trip delay constant using the formula $$\sum_{i=1}^{N} f(p(\text{loss})^i),$$

wherein f is a pre-determined function, p(loss) is a packet loss probability for the current frame, and N is an upper limit of the summation, or determining the round-trip delay constant as a pre-determined integer.

16. The method of claim 14, wherein determining the round-trip delay for the current frame includes at least one of determining the round-trip delay for the current frame based on a round-trip time of the current frame and a round trip time of one or more previously received frames, the previously received frames received before the current frame, determining the round-trip delay for the current frame as the larger of a round-trip delay of a previous frame and the round-trip time of the current frame, or determining the round-trip delay for the current frame as a maximum of the round-trip times of a pre-determined number of the previously received frames if there is a sudden change in round-trip times of the previous frames and current frame or a drift change in round-trip times of the previous frames and current frame.

17. The method of claim 14, wherein determining the round-trip delay comprises:
   determining at least one statistic of round-trip times of at least some of the plurality of frames; and
   determining the round-trip delay as a maximum of the round-trip times of a pre-determined number of previously received frames if a sudden round-trip time change or a drift round-trip time change is detected using the at least one statistic.

18. The method of claim 17, wherein determining the at least one statistic comprises:
   (a) a difference between the round-trip delay and the round-trip times of at least some of the plurality of frames; and
   (b) a variance of the round-trip times of at least some of the plurality of frames; and wherein determining the round-trip delay includes:
   detecting a drift round-trip time change using the formula $$\sum_{i=0}^{N_1-1} u(\tilde{T}_2(n-i) - \gamma_3) > \gamma_4,$$

wherein
$N_1$ is the pre-determined number of previously received frames;
u( ) is the unit step function;
$\tilde{T}_2(n-i)$ is the difference between the average round-trip time and the round-trip delay of frame n−i;
n is the index of the current frame in the video stream;
$\gamma_3$ is the variance multiplied by a pre-determined constant; and
$\gamma_4$ is a drift-change threshold.

* * * * *